United States Patent [19]
Landler

[11] Patent Number: 5,581,434
[45] Date of Patent: Dec. 3, 1996

[54] APPARATUS INCLUDING A TRANSIENT VOLTAGE SUPPRESSOR

[75] Inventor: Martin Landler, Bad Vöslau, Austria

[73] Assignee: U.S. Philips Corporation, New York, N.Y.

[21] Appl. No.: 517,636

[22] Filed: Aug. 22, 1995

[30] Foreign Application Priority Data

Aug. 24, 1994 [EP] European Pat. Off. .............. 94202426

[51] Int. Cl.⁶ .................................................. H02H 1/00
[52] U.S. Cl. .............................. 361/118; 361/56; 361/91; 361/111
[58] Field of Search .............................. 361/118, 35, 38, 361/127, 40, 119, 56, 91, 111; 200/144

[56] References Cited

U.S. PATENT DOCUMENTS 4,104,496  8/1978  Koike et al. ........................... 200/144
4,975,797  12/1990  Veverka et al. ......................... 361/35

FOREIGN PATENT DOCUMENTS 0318644  6/1989  European Pat. Off. ...... H01R 13/703

*Primary Examiner*—Jeffrey A. Gaffin
*Assistant Examiner*—Stephen W. Jackson
*Attorney, Agent, or Firm*—Arthur G. Schaier

[57] ABSTRACT

An apparatus including at least one input terminal for electrical connection to an external conductor, a ground terminal and a protection circuit connected between the input and ground terminals. The protection circuit comprises at least one transient voltage suppressor. During a test, the transient voltage suppressor can be made inoperative by a switch that interrupts the electrical continuity of the protection circuit. At least the protection circuit and the switch are accommodated in a housing.

8 Claims, 3 Drawing Sheets

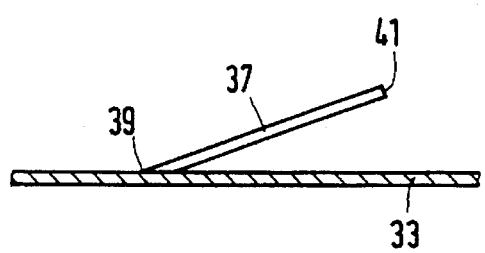
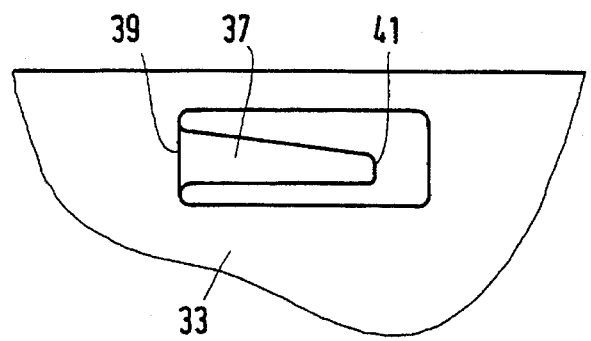
FIG.3A  FIG.3B
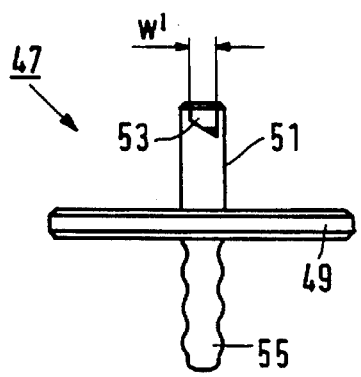
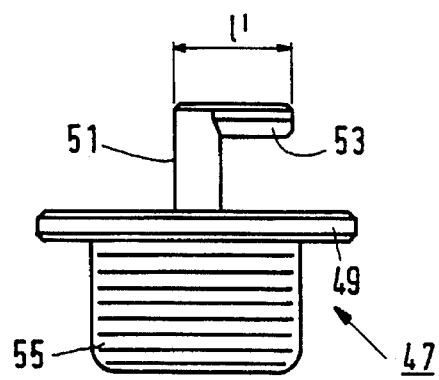
FIG.4A  FIG.4B
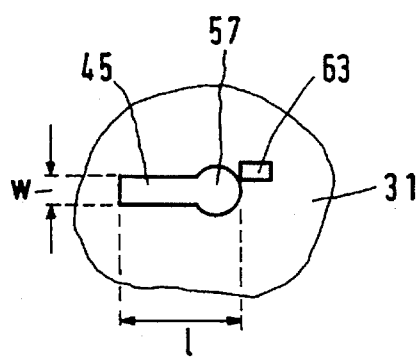
FIG.5

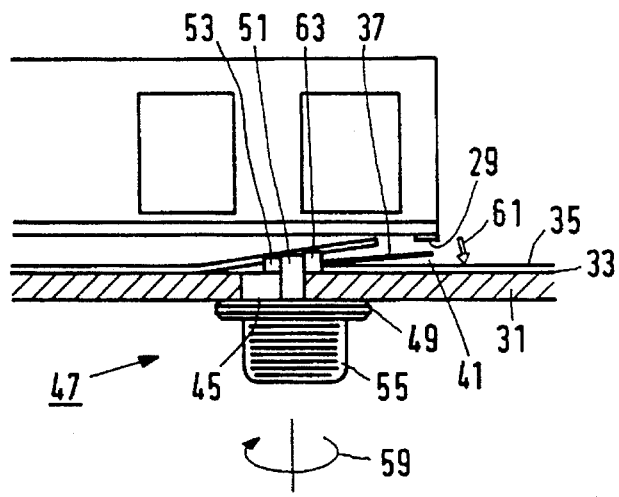
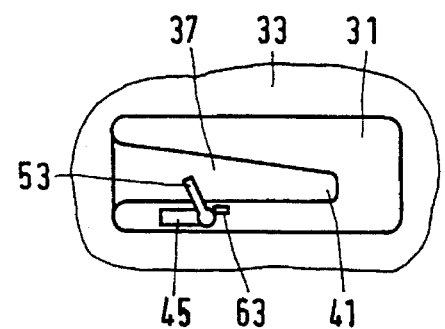
FIG.6A    FIG.6B
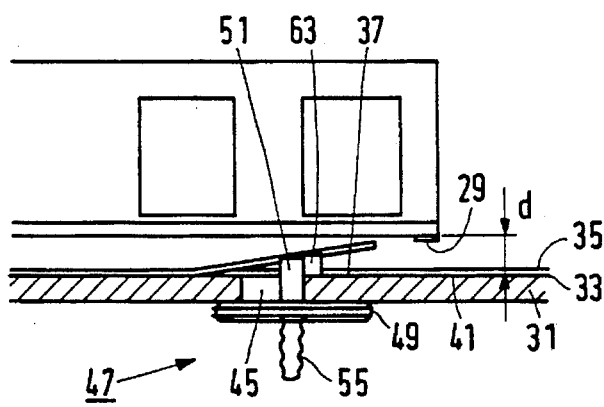
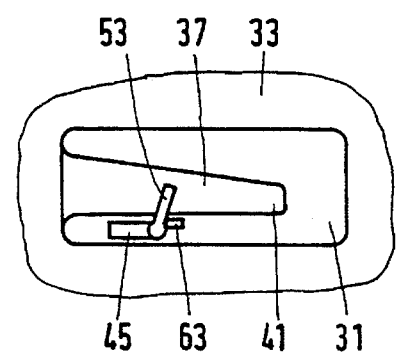
FIG.7A    FIG.7B
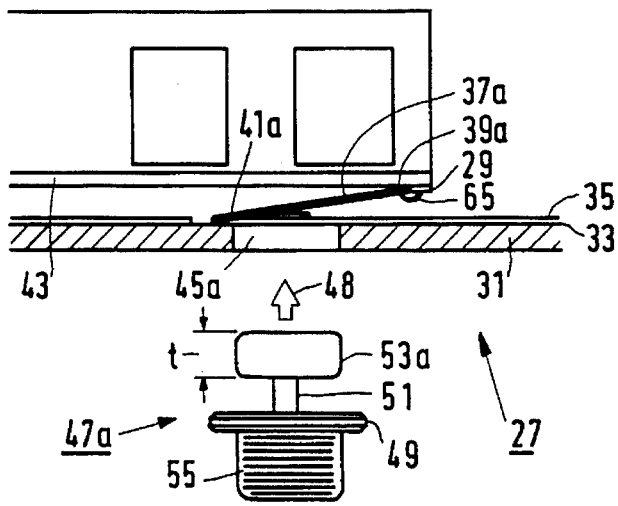
FIG.8

5,581,434

APPARATUS INCLUDING A TRANSIENT VOLTAGE SUPPRESSOR

BACKGROUND OF THE INVENTION

1. Field of the Invention

The invention relates to an apparatus comprising at least one input terminal adapted to be electrically connected to an external conductor, a ground terminal, and a protection circuit connected between the at least one input terminal and the ground terminal. The protection circuit comprises at least one transient voltage suppressor and a switch for interrupting the electrical continuity of the protection circuit, at least the protection circuit and the switch being accommodated in a housing.

2. Description of the Related Art

Such an apparatus is known and has been sold by applicant. The known apparatus is a facsimile apparatus with type number HFC4 in which an interface unit is conceived to take care of the communication between the facsimile electronics (which are accommodated in a signal processing unit) and an external conductor which is formed by the telephone line to which its input terminal can be connected by a standard telephone plug. A power supply unit serves to provide the interface and signal processing units with electric power. It is possible for the telephone line to carry transient voltages that may be caused, for example, by lightning. The transient voltage suppression means of the protection circuit serve to divert such transient voltages to the ground terminal in order to prevent damage to the apparatus. These means may comprise elements that become electrically conductive when a predetermined voltage across their terminals is exceeded. Examples of such elements are varistors, Zener diodes and spark gaps.

In the known apparatus non-galvanic coupling means (for example transformers or optocouplers) are provided between the interface unit and the signal processing unit and between the interface unit and the power supply unit because, in operation, it is not allowed for a direct electrical connection to exist between the telephone line on the one hand and the power supply unit or the signal processing unit on the other hand. Only signals are allowed to be exchanged between these components. The reason for this is that the telephone network has a ground of its own that is usually floating with respect to the ground terminal of the power supply unit, the latter usually being connected to the safety ground of the electric mains. Therefore, it is necessary to test the isolation between the combination of input terminal and interface unit on the one hand and the power supply and signal processing units on the other hand. This test should be performed before the apparatus leaves the factory and also at regular intervals during the life of the apparatus, for example after repairs have been made. A convenient and generally accepted test consists in providing a high voltage (for example 2000 to 2500 volts) between every input terminal and the ground terminal. If the non-galvanic coupling means provide sufficient isolation, no current will flow during this test. However, such a high voltage would, of course, cause the transient voltage suppression means to become electrically conductive so that the test would indicate a failure of the isolation. To prevent this, means have been provided for interrupting the protection circuit before performing the high voltage test. For this purpose, the known facsimile apparatus HFC4 comprises a male connector soldered to a printed circuit board (PCB) and a female connector cooperating with the male connector. However, the male and female connectors can only be connected or disconnected after the housing has been opened. Moreover, due to the lack of space in the housing it is difficult to handle the female connector.

SUMMARY OF THE INVENTION

It is an object of the invention to provide an apparatus of the kind set forth that is free of the problems set forth above and in which it is very simple and easy to operate the means for interrupting the continuity of the protection circuit. To achieve this object, the apparatus in accordance with the present invention includes a mechanically operated on-off switch for interrupting the continuity of the protection circuit and a tool, provided for operating the switch from outside the housing in a closed condition of the housing. The means for interrupting are now operative without the housing being opened and, consequently, it is not necessary to open the housing in order to perform the high voltage test. Because the housing remains closed during this test, it is impossible for objects to enter the housing. Such objects (for example screws or other small metallic parts) could have a negative influence on the good electrical isolation between individual components of the apparatus. Mechanically operated on-off switches can easily withstand the high voltage and they are relatively inexpensive.

Usually, the housing of the apparatus comprises a wall with an electrically conductive inner surface that is conceived to serve as a ground plane. In a preferred embodiment the switch comprises an electrically conductive resilient member having a fixed end portion electrically connected to the conductive surface or to a terminal of the transient voltage suppressor and a free end portion bearing against the terminal or against the conductive surface, the operating member being capable of temporarily separating the free end portion from the terminal or the conductive surface. In this embodiment the construction of the switch is extremely simple and inexpensive. The operating member can be permanently attached to the wall.

In a further embodiment an aperture is provided in the wall close to the resilient member, the operating member comprising a tool having an active portion that is conceived to be inserted through the aperture so as to urge the free end of said member away from the terminal or the conductive surface. The tool can be a part of the equipment for performing the high voltage test in order to make sure that it is always removed after completion of the test. It is to be noted that a switch comprising a resilient member that is operated by an external tool is known per se from EP-B-0 318 644. In that case the tool is a part of a connector.

Preferably, the tool further comprises a flange portion, the active portion being attached to the flange portion and being substantially L-shaped or T-shaped with a first part extending substantially perpendicularly to the flange portion and a second part extending substantially parallel to the flange portion, the aperture being substantially rectangular and having a length and a width that exceed the corresponding dimensions of the second part of the active portion.

BRIEF DESCRIPTION OF THE DRAWINGS

For a fuller understanding of the invention, reference is had to the following description taken in connection with the following drawings, in which:

FIG. 3A is an enlarged sectional view of the plate illustrated in FIG. 2;

FIG. 3B is an enlarged plan view of the plate illustrated in FIG. 2;

FIG. 4A is front elevational view of a tool constructed in accordance with the present invention;

FIG. 4B is a side elevational view of the tool depicted in FIG. 4A;

FIG. 5 is a plan view of a portion of the wall depicted in FIG. 2 and further illustrating as aperture;

DETAILED DESCRIPTION OF THE PREFERRED EMBODIMENTS

Figure 1:
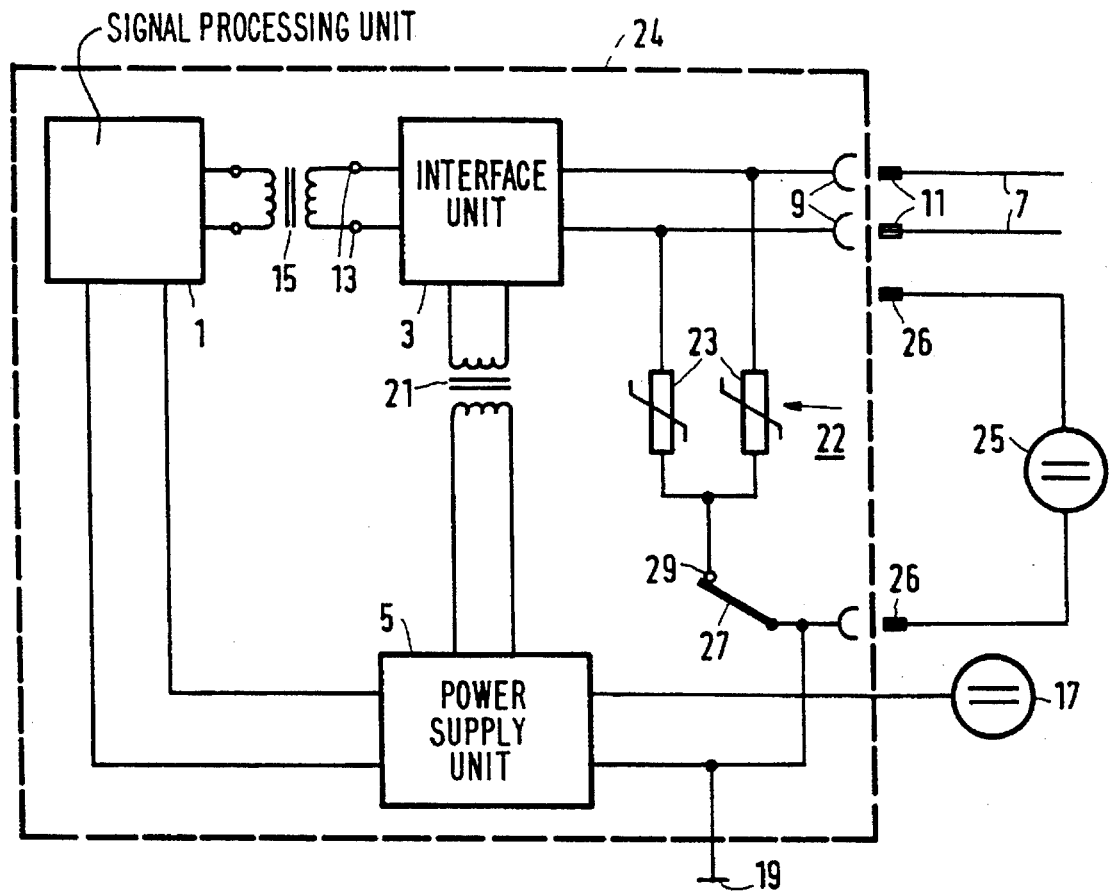
FIG. 1 shows a block diagram of an embodiment of the apparatus in accordance with the invention.

The apparatus shown in FIG. 1 comprises a signal processing unit 1, an interface unit 3 and a power supply unit 5. The apparatus is, for example, a facsimile apparatus. In that case the signal processing unit 1 serves to process (digital) facsimile signals and to print images representing the information contained in these signals and/or to read an original image and produce facsimile signals representing the image. The interface unit 3 serves to connect the signal processing unit 1 to external conductors 7, in this case a telephone line, and to extract facsimile signals from the signals on that line and/or produce outgoing signals modulated with facsimile signals from the signal processing unit 1. The interface unit 3 comprises input terminals 9 that are adapted to be electrically connected to the external conductors 7, for example a standard telephone plug. The interface unit also comprises output terminals 13 that are connected to the signal processing unit 1. The latter connection is via first non-galvanic coupler 15.

The power supply unit 5 serves to provide the signal processing unit 1 and the interface unit 3 with electric power. The input of the power supply unit 5 is, for example, connected to a source 17 of DC voltage which may comprise a known combination of a transformer and a rectifier connected to an electric mains (not shown). The power supply unit is further connected to a ground terminal as indicated at 19. The ground terminal 19 is preferably connected to the electrical safety ground of the mains. One output of the power supply unit 5 is directly connected to the signal processing unit 1 and another output is connected to the interface unit 3 via a second non-galvanic coupler 21. In this embodiment the non-galvanic couplers 15 and 21 are transformers. Other non-galvanic couplers, such as optocouplers, may also be used.

Transient voltages could reach the input terminals 9 via the external conductors 7. This may happen, for example, if these conductors are struck by lightning. Such transient voltages could easily cause damage to the apparatus. To prevent such damage, the input terminals 9 are connected to the ground terminal 19 by means of a protection circuit 22 comprising transient voltage suppressors 23. The transient voltage suppressor 23 normally have an extremely high electrical resistance but they become electrically conductive when the voltage across their terminals exceeds a predetermined value. In the embodiment shown, the transient voltage suppressor 23 comprise varistors, one varistor being connected between each input terminal 9 and the ground terminal 19. Other examples of suitable transient voltage suppressors are spark gaps and Zener diodes. The various components of the apparatus, including the protection circuit 22, are accommodated in a housing 24 shown in dotted lines.

The telephone lines 7 are floating with respect to the ground terminal 19 and, consequently, there may not be a direct connection between these telephone lines and the ground terminal. This is the reason why the connections between the interface unit 3 on the one side and the signal processing unit 1 and the power supply unit 5 on the other side comprise the non-galvanic couplers 15 and 21. These couplers provide DC isolation, but allow AC signals to pass freely. It is sometimes necessary to test the integrity of this isolation, for example before the apparatus leaves the factory and after repairs have been made to it. This test is usually performed by connecting a DC voltage source 25 between at least one of the input terminals 9 and the ground terminal 19. For this purpose the DC voltage source is provided with plugs 26. The DC voltage source 25 may provide a DC voltage of 2000 or 2500 V and, if the isolation is intact, no current will flow when it is connected. However, the DC voltage source 25 is also connected between the terminals of the voltage suppressor 23 which will become electrically conductive as a result of the high voltage. Therefore, it is impossible to perform the high voltage test while there exists a continuous circuit comprising one of the input terminals 9, the transient voltage suppressor 23 and the ground terminal 19. For this reason the test is sometimes performed in the factory before the transient voltage suppressor 23 have been installed. This procedure is not entirely correct and, moreover, it does not solve the problem of testing after repairs have been made. To overcome these problems, the apparatus shown in FIG. 1 comprises a switch 27 for interrupting the continuity of the protective circuit 22. In the embodiment shown this device may comprise a mechanically operated on-off switch that is connected between the transient voltage suppressor 23 and the ground terminal 19. For this purpose, a mechanically operated switch is more reliable than a semiconductor switch (for example a thyristor or a transistor). The position of the switch 27 between the transient voltage suppressor 23 and the ground terminal 19 has several advantages over the alternative position between the input terminals 9 and the transient voltage suppressor. A first advantage is that the transient voltage suppressor 23 have a common terminal 29 that is normally connected to the ground terminal 19. Consequently, a single switch between this common terminal and the ground terminal 19 is sufficient to interrupt the connection of all transient voltage suppressor 23 whereas a separate switch for each of these suppressor would be necessary if the switch would be connected between these suppressor and the output terminals 9. A second advantage is that the construction of the switch 27 can be made extremely simple if it is to be connected to the ground terminal 19. This will be apparent from the description of FIGS. 2–7.

Figure 2:
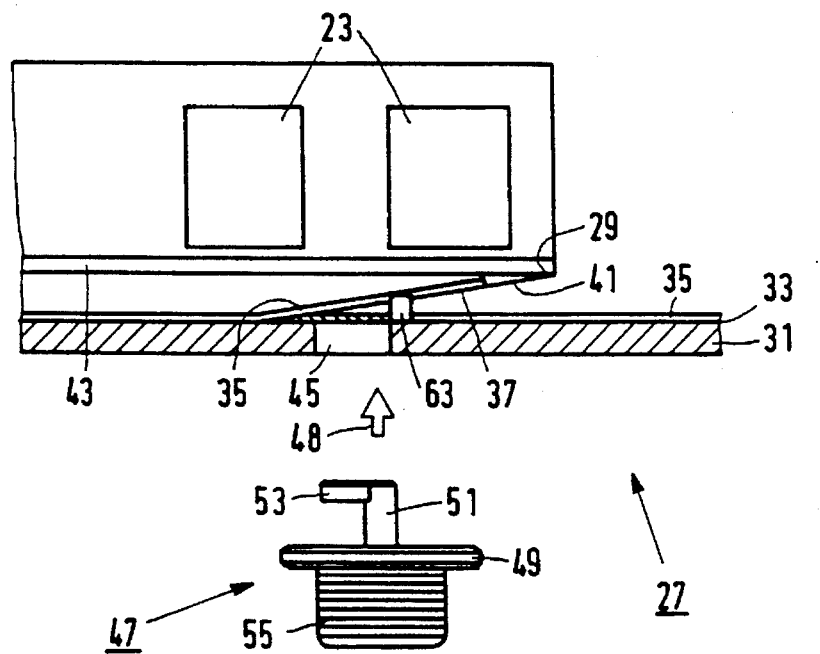
FIG. 2 is a sectional view of an embodiment of an on-off switch that may be used in the apparatus shown in FIG. 1, shown in the closed state.

FIG. 2 is a sectional view of a portion of the apparatus comprising an embodiment of the switch 27. In the figure a portion of one of the walls 31 of the housing 24 is visible. The wall 31 is preferably made of an electrically insulating material. The inner surface of the wall 31 has been made electrically conductive by attaching a thin metal plate 33 to it. This plate is electrically connected to the ground terminal 19 and serves as a ground plane for the apparatus. The face of the plate 33 facing the interior of the apparatus is preferably covered with an electrically insulating layer 35, for example a foil of insulating material.

FIGS. 3A and 3B are a sectional view and a plan view, respectively, of the plate 33 on an enlarged scale. The plate 33 is made of a resilient material and an elongated member 37 has been formed in it by punching. The member 37 has been cut free from the plate 33 at all sides except one extremity so that it forms a resilient tongue having a fixed end portion 39 attached to the plate. This resilient member 37 has been bent from the plane of the plate 33 so that its free end portion 41 points to the interior of the housing 24. Instead of the elongated member 37 that forms part of the plate 33 a separate resilient member such as a leaf spring could be provided. Further, it is possible to provide an additional spring (not shown) that urges the member elongated member in the upward direction in FIG. 2.

As shown in FIG. 2, the insulating layer 35 also covers a major portion of the resilient member 37, leaving the free end portion 41 uncovered. This free end portion bears against the terminal 29 of the transient voltage suppressor 23. The voltage suppressor 23 are provided on a printed circuit board (PCB) 43 in the housing. The terminal 29 is electrically connected, via the metallization on the PCB 43 (not shown) to the transient voltage suppressor 23. The resilient member 37 thus connects the terminal 29 to the plate 33, keeping the switch 27 in the closed state.

An aperture 45 is provided in the wall 31. Through this aperture a tool 47 can be inserted as indicated by the arrow 48 in order to open the switch 27. The tool 47 comprises a flange portion 49 and an active portion having a first part 51 and a second part 53. A grip 55 is provided at one side of the flange portion 49. FIGS. 4A and 4B show the tool 47 in two positions on an enlarged scale and FIG. 5 is a plan view of the portion of the wall 31 that comprises the aperture 45. The first part 51 of the active portion is attached to the flange portion 49 opposite the grip 55 and extends substantially perpendicularly to the flange portion. The second part 53 extends substantially parallel to the flange portion 49 and is attached to the free end of the first part 51 so that the active portion is substantially L-shaped. The aperture 45 is substantially rectangular having a length l and a width w that slightly exceed the corresponding dimensions l' and w' of the second part 53 of the active portion of the tool 47. The aperture 45 extends substantially parallel to the resilient member 37 and is situated close to that member. Near one of its ends the aperture 45 is provided with a substantially circular portion 57 having a diameter that slightly exceeds the diameter of the first part 51 of the active portion. The active portion can thus be inserted through the aperture 45 to urge the free end 41 of the resilient member 37 away from the terminal 29 as will be explained in detail with reference to FIGS. 6 and 7.

FIGS. 6A and 7A are sectional views similar to FIG. 2 and FIGS. 6B and 7B are plan views of the resilient member 37 and the portion of the wall 31 close to that member. FIGS. 6A and 6B show the situation shortly after the tool 47 has been inserted into the aperture 45 and FIGS. 7A and 7B show the situation with the switch 27 in the open state. For the same elements the same reference numerals have been used as in FIGS. 2–5. As shown in FIG. 2, the tool 47 is inserted into the aperture 45 in the direction of the arrow 48, the tool being in a position such that the second part 53 of the active portion is parallel to the longitudinal direction of the aperture. The tool 47 is inserted until the flange portion 49 abuts the outer surface of the wall 31. The free end of the second part 53 is then in a position just above the resilient member 37. As can be seen in FIG. 4A, the side of the second part 53 that faces the resilient member 37 (the left side in FIG. 4A) is bevelled. Therefore, when the tool 47 is rotated in the direction of the arrow 59 as shown in FIG. 6A, the second portion slides between the resilient member 37 and the part of the insulating foil 35 directly overlying this member. The second part thus presses the resilient member 37 downwards in the direction of the wall 31 as indicated by the arrow 61. The free end 41 of the resilient member 37 is thereby urged away from the terminal 29. This continues until the second part abuts a protrusion 63 provided on the inner surface of the wall 31, resulting in the situation shown in FIGS. 7A and 7B. The resilient member 37 is now pressed entirely against the inner surface of the wall 31 and its free end 41 is at a maximum distance d from the terminal 29. This distance d may be about 2.5 mm which is sufficient to withstand the 2000 to 2500 V supplied by the voltage source 25. After completion of the high voltage test the tool 47 is removed and the resilient member 37 resumes its original position shown in FIG. 2.

FIG. 8 is a sectional view of a second embodiment of the switch 27 in which elements that are the same as in the first embodiment are indicated with the same reference numerals as in FIG. 2. In this embodiment, an electrically conductive resilient member 37a has a fixed end portion 39a that is electrically and mechanically connected to the terminal 29, for example, by a rivet 65. The resilient member 37a has a free end portion 41a which bears against the conductive surface 33. The tool 47a differs from the tool 47 in that its active portion is T-shaped, comprising a first part 51 that is substantially the same as the first part of the tool 47 and a second part 53a extending substantially parallel to the flange portion 49 and attached to the first part with its central part. An aperture 45a is provided in the wall 31, the aperture having a length and a width slightly exceeding the length and width of the second part 53a. When the tool 47a is inserted into the aperture 45a in the direction of the arrow 48, the resilient member 37a is pushed upwards so that its free end 41a is lifted from the conductive surface 33. When the tool 47a is fully inserted, the resilient member 37a is parallel to the PCB 43 and the distance between its free end 41a and the conductive surface 33 is the same as the thickness t of the second part 53a, which may be equal to the distance d shown in FIG. 7A. The tool 47a can then be rotated over approximately 90° in order to lock it in its position. After completion of the high voltage test, the tool 47a is removed and the resilient member 37a resumes the position shown in FIG. 8.

It will be apparent to the skilled person that other embodiments than the described ones are feasible. For example, in the embodiment shown in FIG. 2 the resilient member 47 could be riveted to the wall 31 similar to the construction shown in FIG. 8. In that case the conductive surface 33 could be formed by metallizing the inner surface of the wall 31. It is not necessary that the device for operating the switch is a removable tool. It is also possible to provide for example a member that is attached to the wall 31, this member being conceived to move between a first position in which it urges the resilient member 37 away from the terminal 29 or the conductive surface 33 and a second position in which the resilient member is released. The device for operating the switch can also be permanently connected to an automatic high voltage testing station that is provided at the end of a production line for assembling the apparatus.

I claim:

1. An apparatus comprising at least one input terminal adapted to be electrically connected to an external conductor, a ground terminal, and a protection circuit connected between the at least one input terminal and the ground terminal, said protection circuit comprising transient voltage suppressors means, interrupting means for interrupting the electrical continuity of the protection circuit, at least said protection circuit and said means for interrupting being accommodated in a housing, wherein said interrupting means includes a mechanically operated on-off switch, and operating means for operating said switch from outside the housing in a closed condition of the housing; the housing having a wall with an electrically conductive inner surface serving as a ground plane, the switch including an electrically conductive resilient member having a fixed end portion electrically connected to said conductive surface or to a terminal of said transient voltage suppression means and a free end portion bearing against said terminal or against said conductive surface, the operating means being capable of temporarily separating said free end portion from said terminal or said conductive surface.

2. The apparatus as claimed in claim 1, wherein said switch is a mechanically operated on-off switch.

3. An apparatus as claimed in claim 1, wherein an aperture is provided in said wall close to said resilient member, said operating means comprising a tool having an active portion to be inserted through said aperture so as to urge said free end of said resilient member away from the terminal or said conductive surface.

4. An apparatus as claimed in claim 3, wherein the tool further comprises a flange portion, the active portion being attached to the flange portion and being substantially L-shaped or T-shaped with a first part extending substantially perpendicularly to the flange portion and a second part extending substantially parallel to the flange portion, said aperture being substantially rectangular and having a length and a width that exceed the corresponding dimensions of the second part of the active portion.

5. An apparatus comprising a housing, at least one input terminal adapted to be electrically connected to an external conductor, a ground terminal, and a protection circuit connected between the at least one input terminal and the ground terminal, said protection circuit comprising at least one transient voltage suppressor, a switch for interrupting the electrical continuity of the protection circuit, at least said protection circuit and said switch being accommodated in said housing, and a tool for operating said switch from outside the housing in a closed condition of the housing;

said housing having a wall with an electrically conductive inner surface as a ground plane; the switch comprising an electrically conductive resilient member having a fixed end portion electrically connected to one of said conductive surface and a terminal of said at least one transient voltage suppressor and a free end portion bearing against the other of said terminal and said conductive surface, the tool being capable of temporarily separating said free end portion from one of said terminal and said conductive surface.

6. The apparatus as claimed in claim 5, wherein said switch is a mechanically operated on-off switch.

7. The apparatus as claimed in claim 5, wherein said tool has an active portion to be inserted through an aperture formed in said wall proximate said resilient member so as to urge said free end of said resilient member away from one of the terminal and said conductive surface.

8. An apparatus as claimed in claim 7, wherein the tool further comprises a flange portion, the active portion being attached to the flange portion and being substantially one of L-shaped and T-shaped, said active portion including a first part extending substantially perpendicularly to the flange portion and a second part connected to one end of the first part and extending substantially parallel to the flange portion, said aperture having a length and a width that exceed the corresponding length and width of the second part of the active portion.

* * * * *